Feb. 9, 1943.          R. B. JOHNSON                2,310,437
                    EDUCATIONAL DEVICE
              Filed Nov. 2, 1940          13 Sheets-Sheet 2
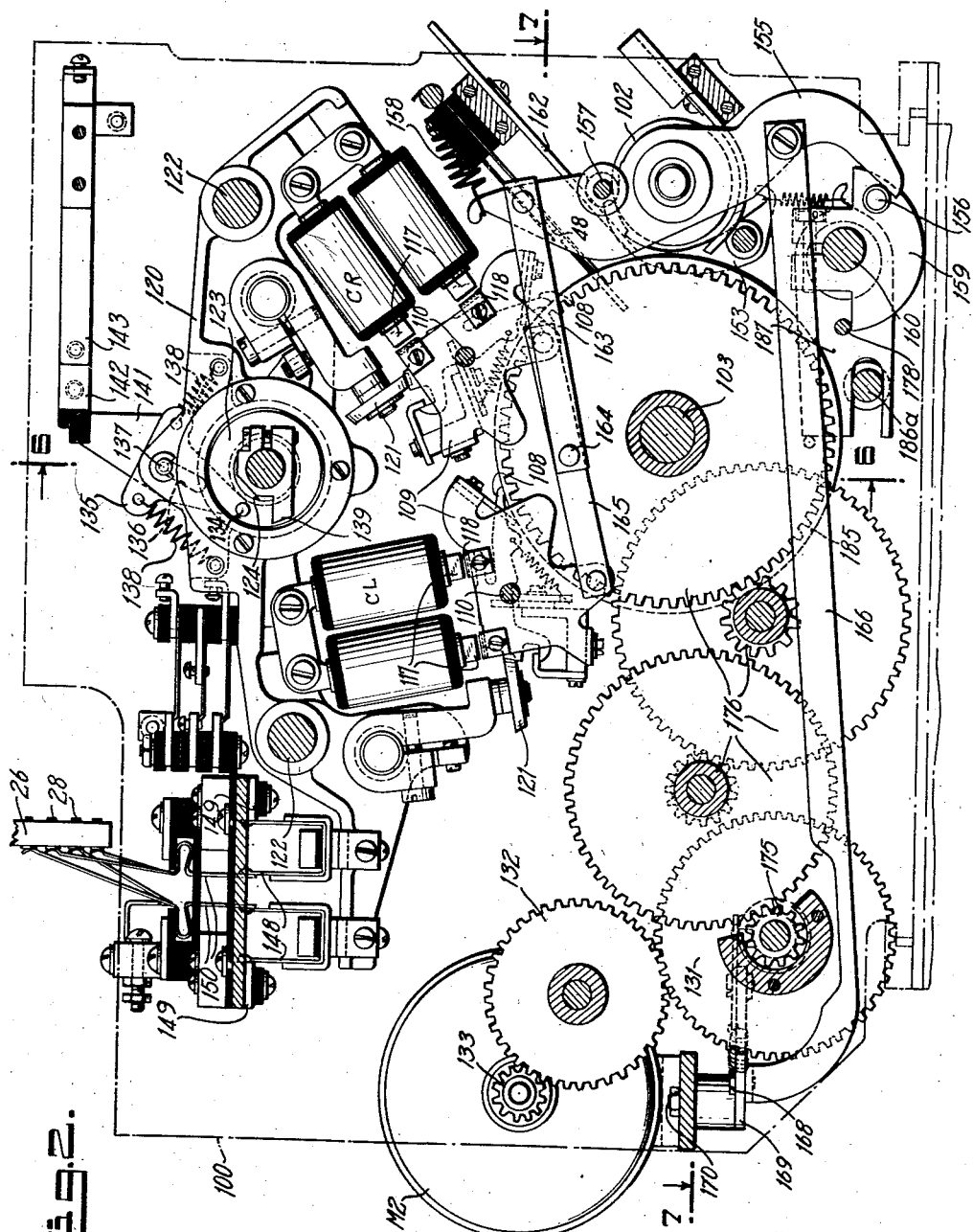
INVENTOR
Reynold B. Johnson
ATTORNEY

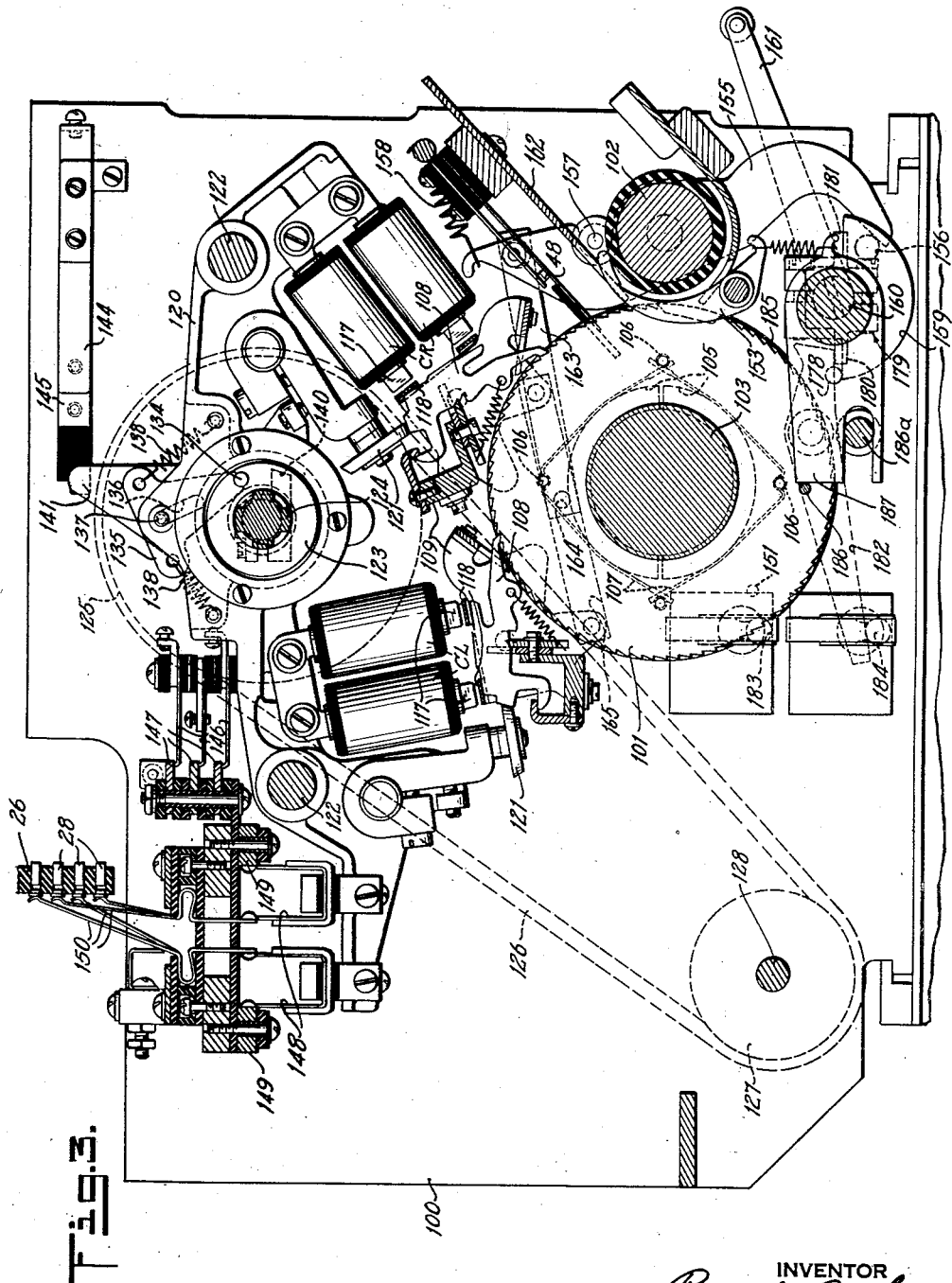

Feb. 9, 1943.            R. B. JOHNSON            2,310,437
                          EDUCATIONAL DEVICE
                        Filed Nov. 2, 1940        13 Sheets-Sheet 4
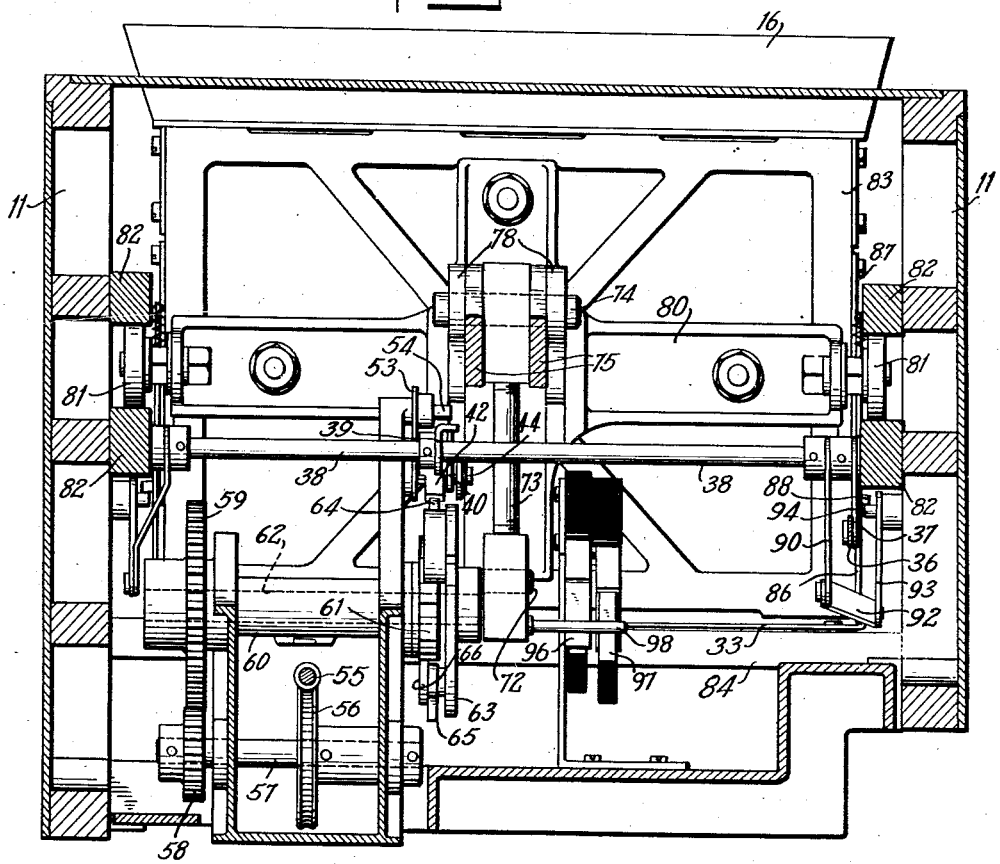
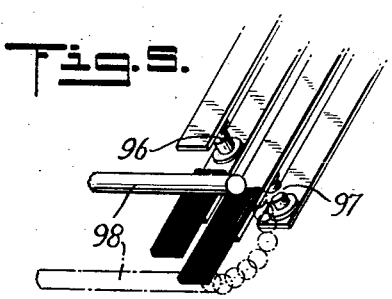
INVENTOR
Reynold B. Johnson
BY
ATTORNEY

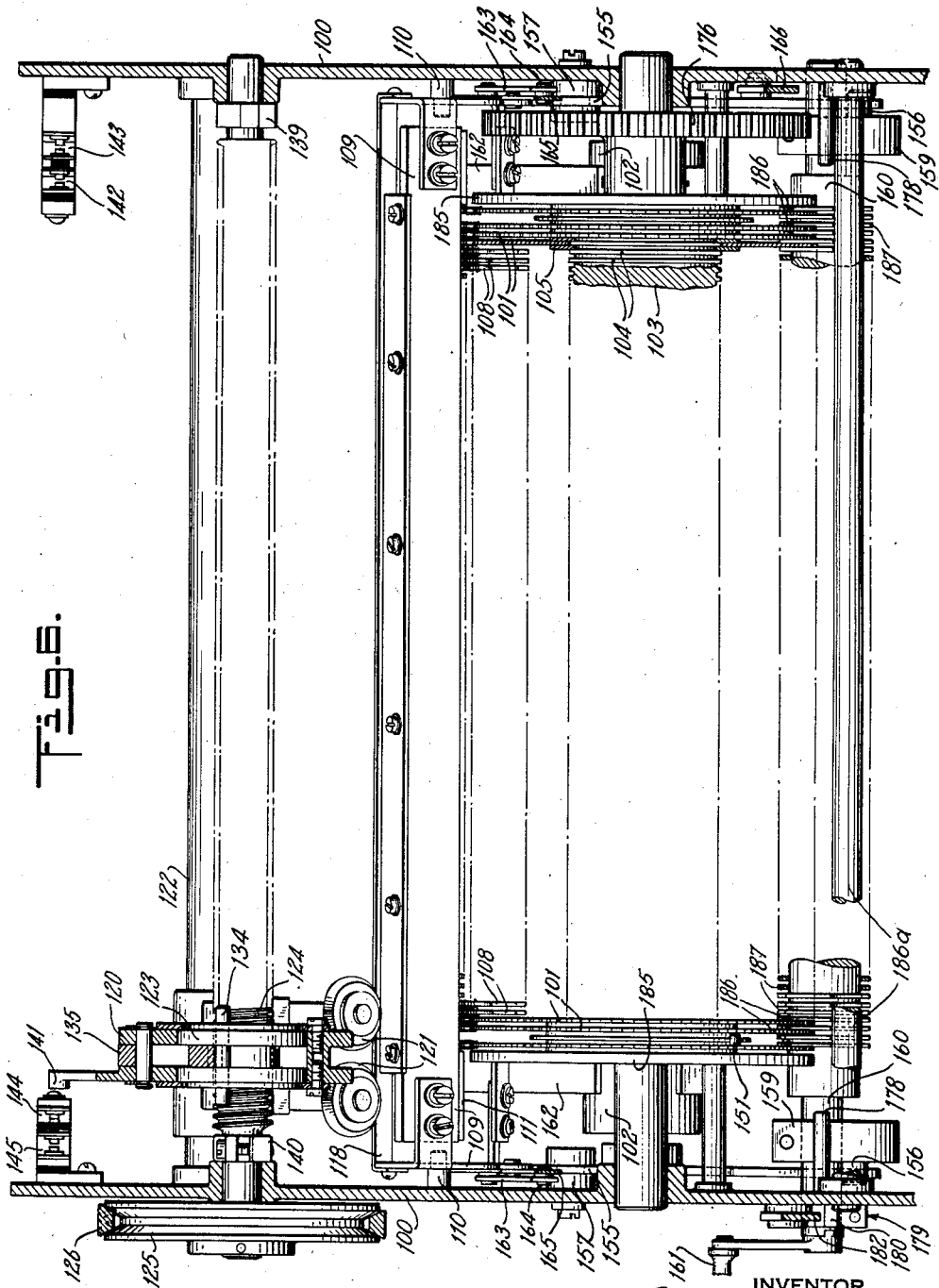

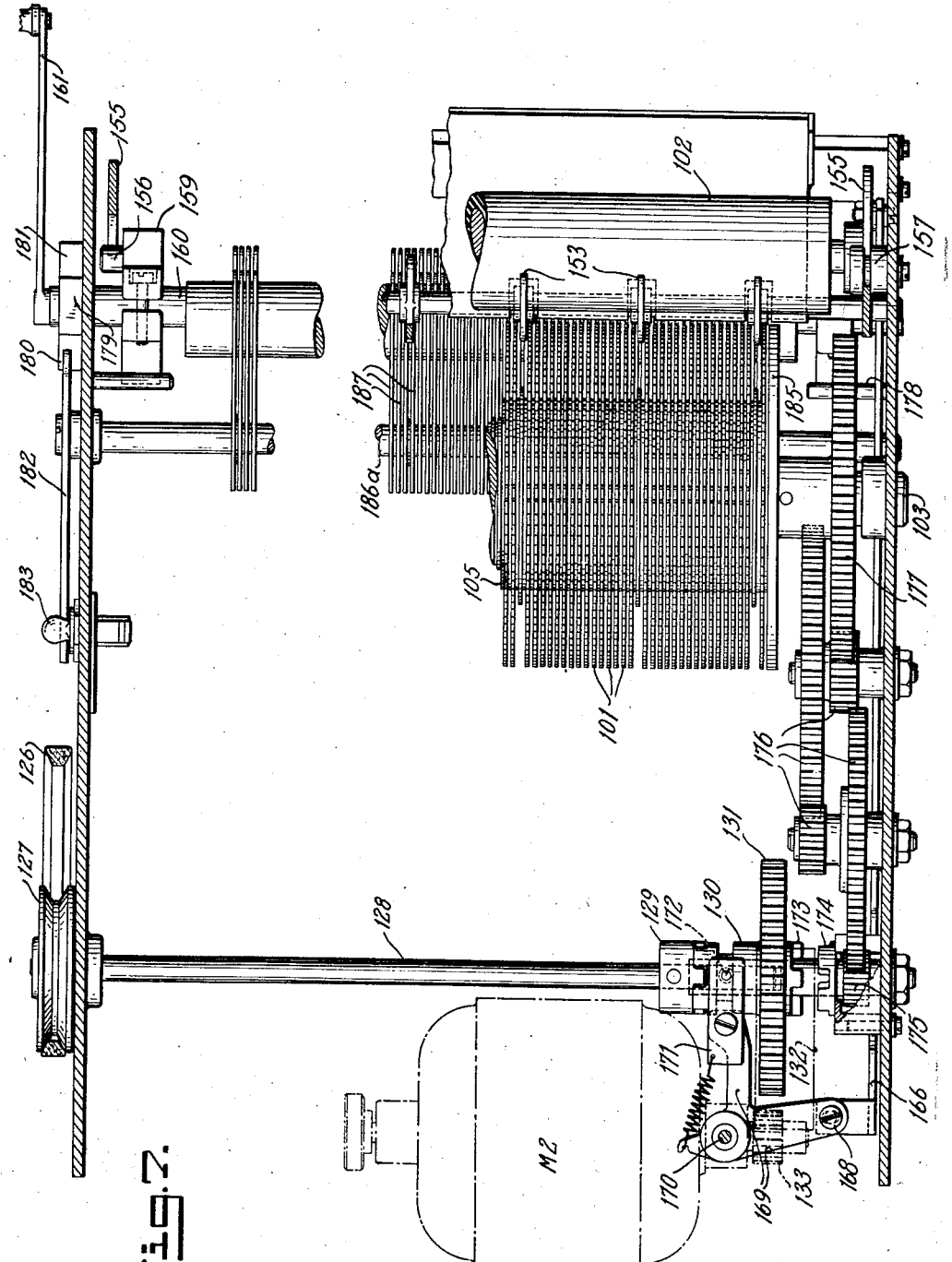

Feb. 9, 1943.  R. B. JOHNSON  2,310,437
EDUCATIONAL DEVICE
Filed Nov. 2, 1940  13 Sheets-Sheet 7

Fig. 8.

TEST SHEET

Fig. 9.

KEY SHEET

Fig. 10.

COMMONING SHEET

INVENTOR
Reynold B. Johnson
BY
ATTORNEY

Feb. 9, 1943.

R. B. JOHNSON 2,310,437

EDUCATIONAL DEVICE

Filed Nov. 2, 1940

INVENTOR
Reynold B. Johnson
BY
ATTORNEY

Feb. 9, 1943.         R. B. JOHNSON         2,310,437
                      EDUCATIONAL DEVICE
                    Filed Nov. 2, 1940      13 Sheets-Sheet 9
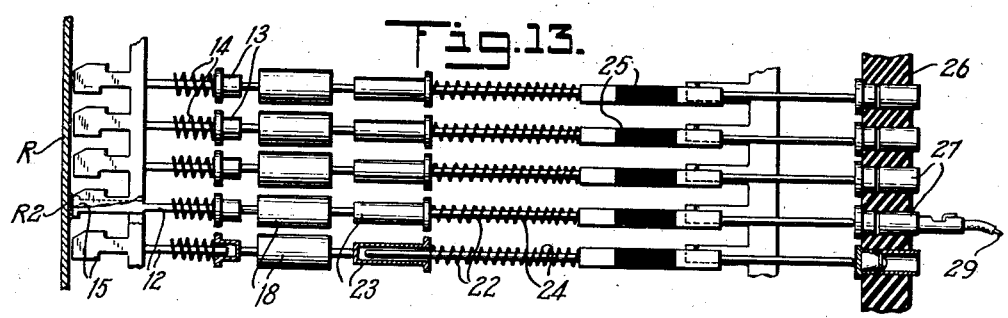
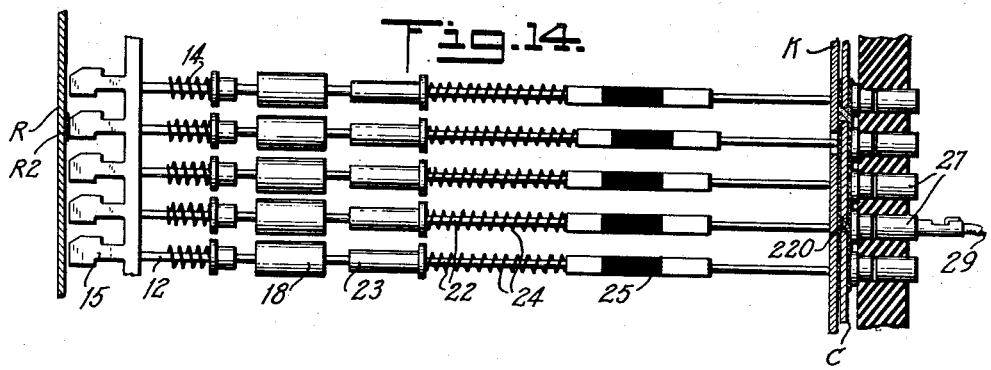
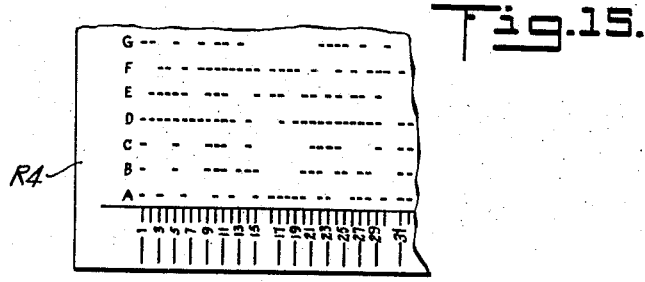
INVENTOR
Reynold B Johnson
BY
ATTORNEY Feb. 9, 1943.    R. B. JOHNSON    2,310,437
EDUCATIONAL DEVICE
Filed Nov. 2, 1940    13 Sheets-Sheet 10
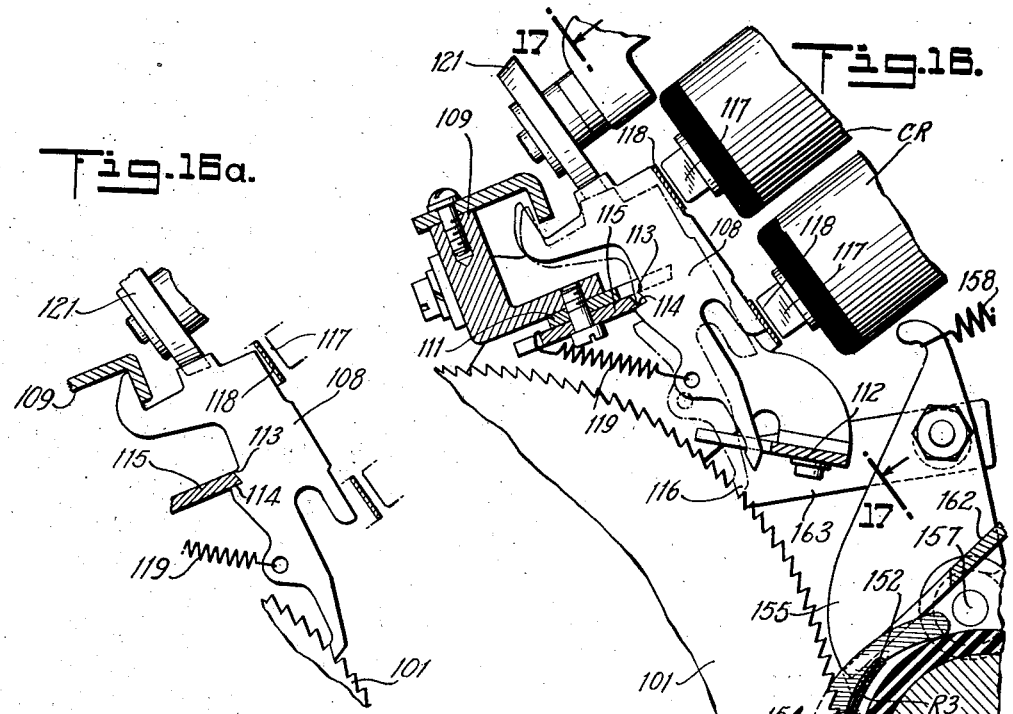
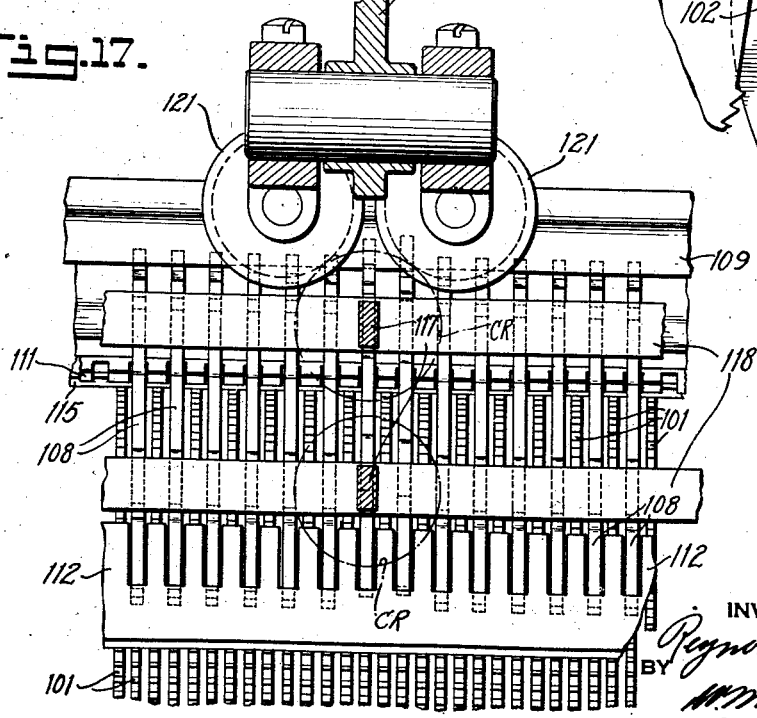
INVENTOR
Reynold B. Johnson
BY
ATTORNEY Feb. 9, 1943.                R. B. JOHNSON                2,310,437
                             EDUCATIONAL DEVICE
                           Filed Nov. 2, 1940            13 Sheets-Sheet 11
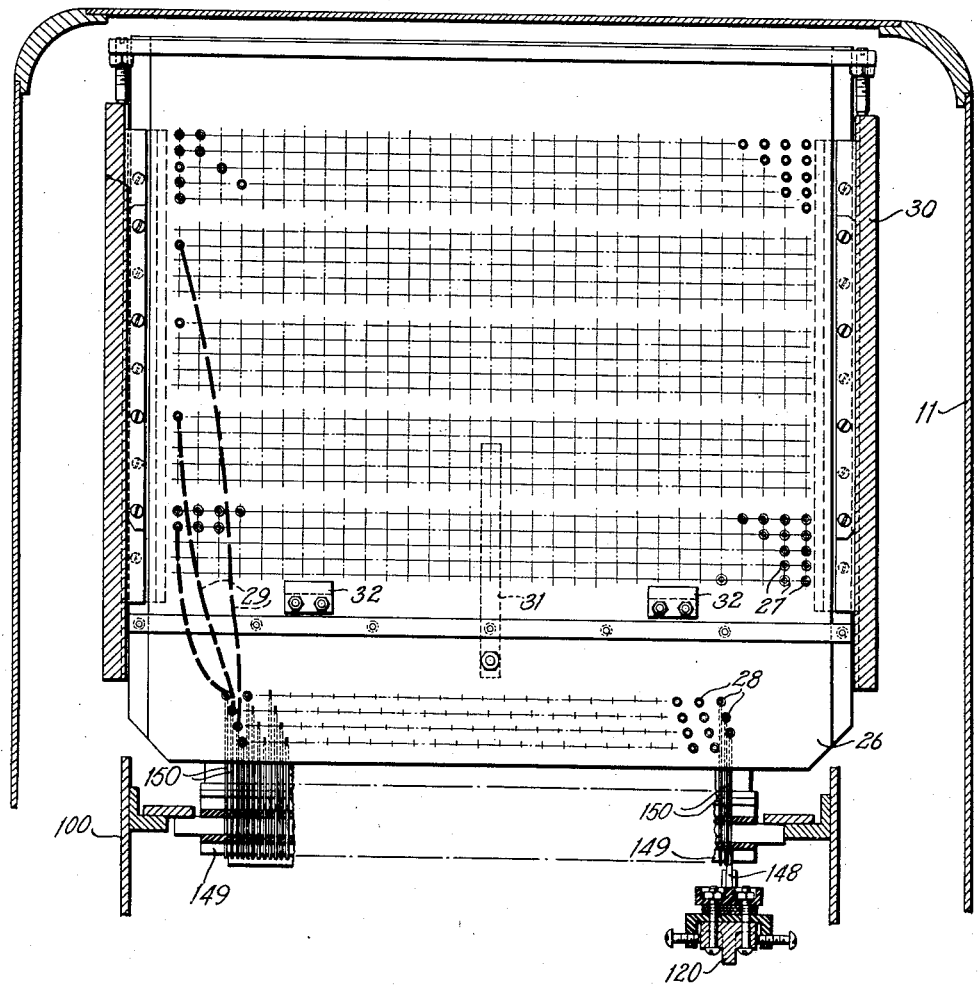
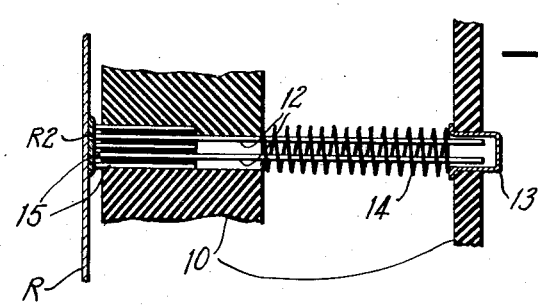
INVENTOR
Reynold B. Johnson
BY
ATTORNEY

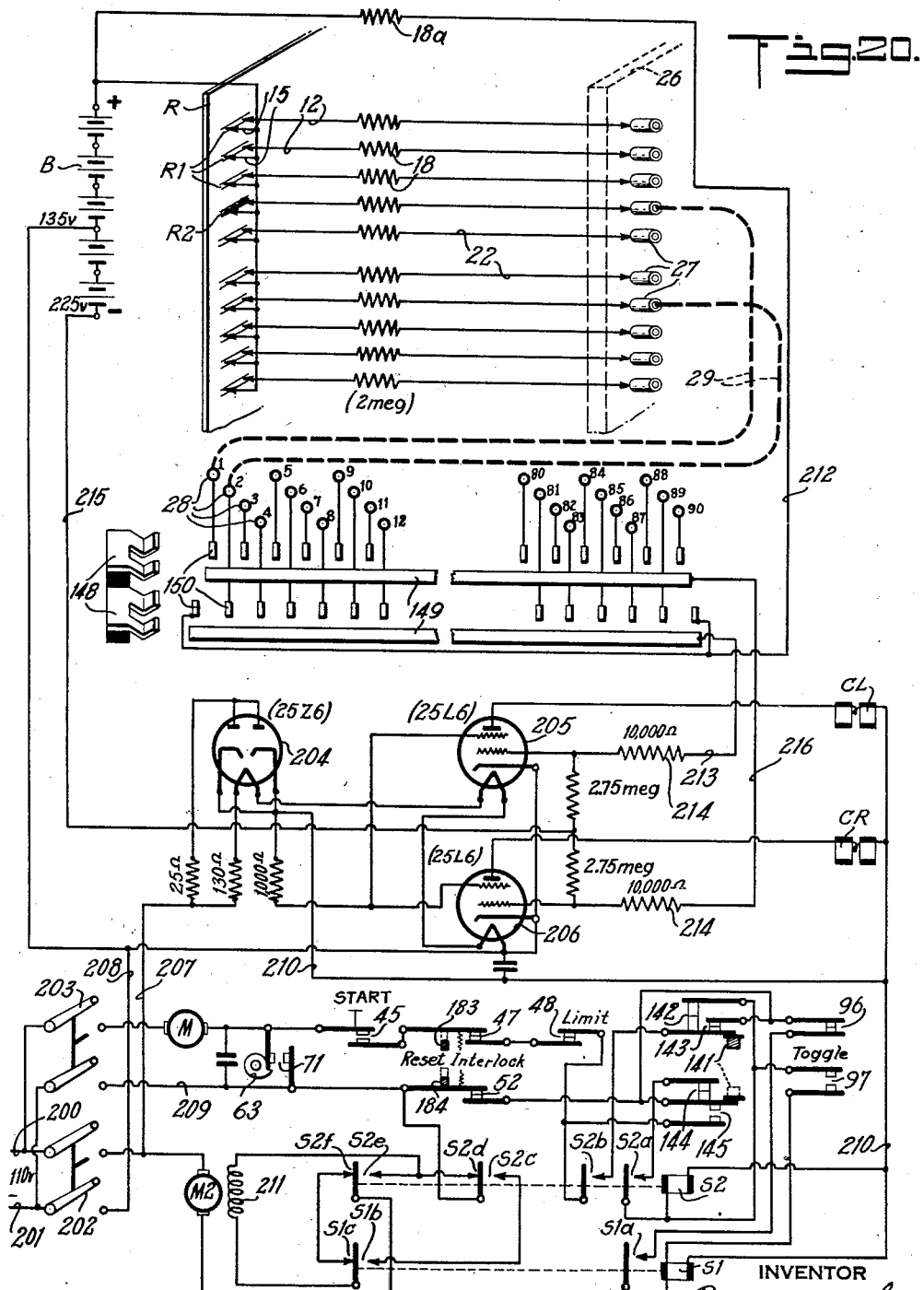

Patented Feb. 9, 1943

2,310,437

UNITED STATES PATENT OFFICE 2,310,437

EDUCATIONAL DEVICE

Reynold B. Johnson, Binghamton, N. Y., assignor to International Business Machines Corporation, New York, N. Y., a corporation of New York Application November 2, 1940, Serial No. 364,029

12 Claims. (Cl. 235—61.9)

The present invention relates to a machine for sensing response sheets upon which an examinee has designated responses by means of pencil marks.

In my copending application Serial No. 214,922, filed June 21, 1938, now Patent 2,275,590 dated March 10, 1942, I disclose the machine to which the present invention is applied. In such application there is disclosed electrical sensing means for sensing the marks on a response sheet and controlling indicating mechanism in accordance with the number of right or wrong responses.

The present invention comprises a novel printing mechanism incorporated in the machine and arranged to respond to the same sensing device. This printing mechanism consists of a plurality of ratchet wheels which may be stepped tooth by tooth from a home position. Each wheel is associated, through selective connecting devices, with a particular marking position on the response sheet, and for each such sheet inserted in the machine upon which a mark is sensed in the particular position, the related ratchet wheel is advanced one step or tooth. When all the response sheets have been passed through the machine, the several ratchet wheels will have been displaced through various angles.

Provision is made to reset the wheels to their home position and in so doing the ratchet wheels are pressed against a record sheet so that the teeth of the wheels print on the sheet a series of parallel dotted lines of varying length, depending upon the extents that the several wheels have been advanced. This sheet thus becomes a composite graph based upon the group of response sheets passed through the machine.

An object of the invention is to construct a print wheel controlling mechanism in which a plurality of coaxial wheels are associated with a plurality of mark sensing positions on a response sheet, in which sheet the marks are concurrently sensed and the wheels are successively controlled by a single controlling mechanism.

As a variant in the operation of the machine the printing ratchets may be operated after the sensing of each response sheet, whereby a different form of graph will be produced which will be a summary showing what questions were answered either correctly or incorrectly by each examinee.

As a further variant, the response sheet itself, after it is sensed and the printing ratchets have been set accordingly, may be inserted in the printing device to receive on the response sheet itself the indications representing the right or wrong answers.

A further object resides in the provision of a novel arrangement utilizing a so-called "key" sheet and a so-called "commoning" sheet to effect a rapid plugging of the machine for operation.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a side elevation of the printing mechanism.

Fig. 3 is a central section through the printing mechanism looking in the same direction as Fig. 2.

Fig. 4 is a section taken on lines 4—4 of Fig. 1.

Fig. 5 is a detail of a pair of contacts whose location is shown in Fig. 4.

Fig. 6 is a section through the printing mechanism taken substantially along lines 6—6 of Fig. 2.

Fig. 7 is a plan section through the printing mechanism taken substantially along lines 7—7 of Fig. 2.

Fig. 8 is a fragment of a response sheet.

Fig. 9 is a fragment of a key sheet.

Fig. 10 is a fragment of a commoning sheet.

Fig. 11 is a view of the record upon which the graph is printed.

Fig. 12 is a view showing a fragment of a response sheet showing the manner in which the graphic indications may be printed thereon.

Figs. 13 and 14 are details showing the sensing devices and related structure.

Fig. 15 is a fragment of a record on which the results are separately indicated according to different response sheets.

Fig. 16 is an enlarged position view of the printing wheel advancing mechanism.

Fig. 16a is a further position view of the parts shown in Fig. 16.

Fig. 17 is a view taken along lines 17—17 of Fig. 16.

Fig. 18 is a detail showing the plugboard arrangement.

Fig. 19 is an enlarged detail of one of the marked sensing units.

Fig. 20 is a wiring diagram of the electric circuits of the machine.

Response sheet

One form of the response or test sheet R upon which the examinee records his selections is shown in part in Fig. 8. The sheet is provided with twenty-five vertical columns arranged in groups of five. Each response designating position R1 is delineated by a pair of vertical parallel lines between which the examinee is to draw a heavy black line R2 with a pencil or pen coextensive with the parallel lines. Thus, for example, if the first question of an examination required the selection of one of five possible answers and, if the examinee selected the fourth given answer as his choice, a pencil mark would be made in the 4 position opposite question 1.

Response sheet sensing unit

Figure 1:
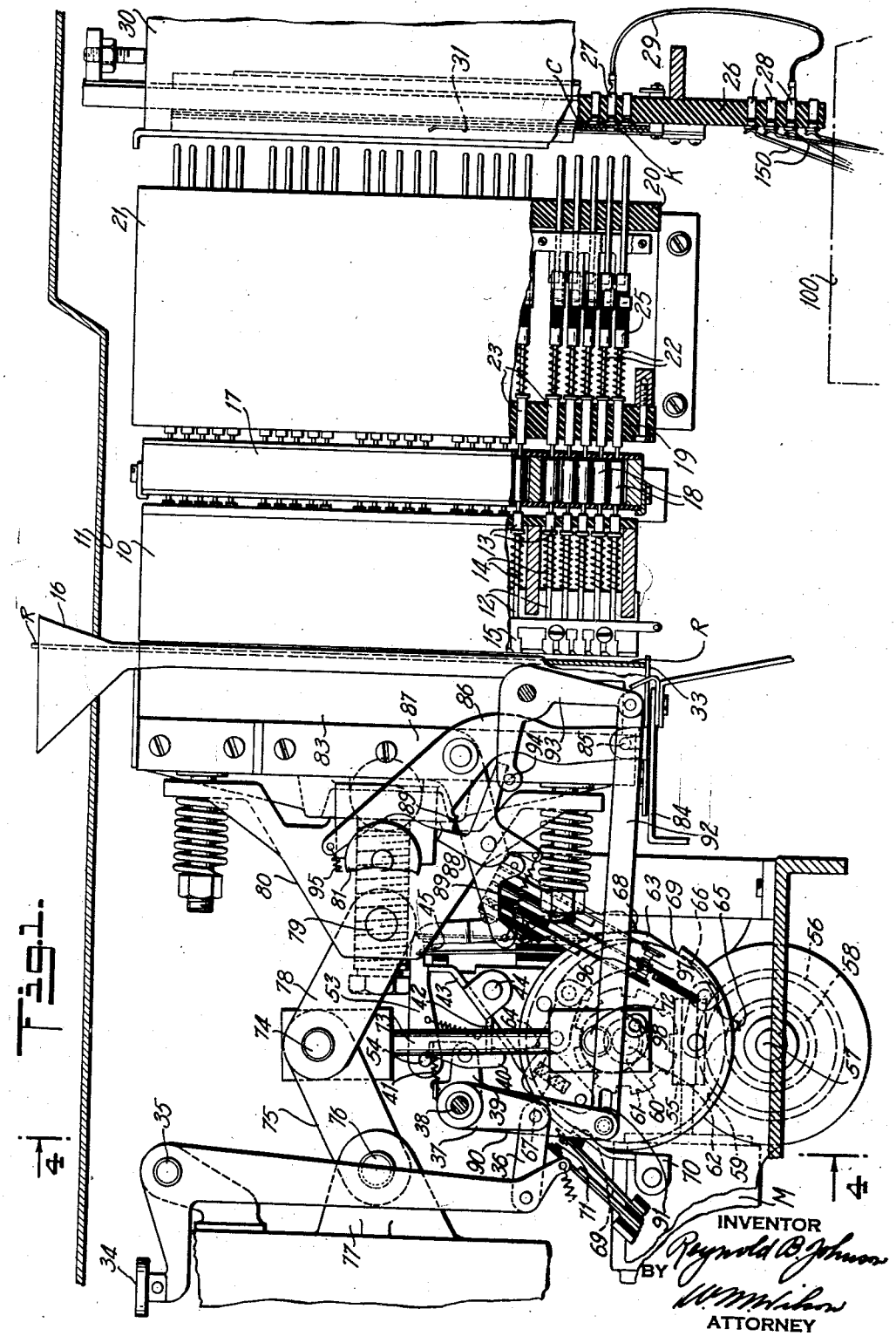
Fig. 1 is a side elevation of the response sheet sensing mechanism.

This unit is shown in Fig. 1 and comprises a box-like frame 10 which is held in the side frames 11 of the machine. For each of the 750 possible marking positions of the response sheet there is a sensing unit, one of which is shown at an enlarged scale in Fig. 19. Each unit comprises a pair of blades 12 extending from the front of frame 10 into a cap 13 and about which there is a spring 14. The cap 13 is free to move axially in the frame 10. Between the two blades 12 and also on the outside of each is a blade 15, which set of three blades is insulated from the set of two blades 12. The blades 15 are electrically connected to one another and connected to one side of the circuit while the pair of blades 12 in each position is also electrically connected through the spring 14 and connected to the other side of the circuit.

When a response sheet upon which a pencil mark R2 is made is tightly pressed against the ends of the blades, the graphite will make an electrical connection between one or more of the blades 15 and one or both of the blades 12, depending on the length of the pencil mark. If the mark is the full length of the marking position, all the blades will be electrically connected, while a shorter mark will also effect a connection as long as it is at least long enough to bridge two of the blades.

Located at the forward end of the frame 10 is a chute 16 (Fig. 1) which guides the response sheet R into position adjacent the ends of the sensing blades, so that each marking position is confronted by a set of sensing pins such as in Fig. 19.

Resistor unit

The machine is provided with a resistor unit shown in Fig. 1 which comprises a frame 17 having front and back walls between which are mounted resistors 18, one for each possible marking position on the response sheet. The resistor unit 17 is lowered vertically into the machine between the side frames 11 and rests upon pins so that the rods extending from the resistors 17 abut against the caps 13 of the sensing blade unit. The resistor unit is urged toward the sensing unit so that the rods engage and move the caps 13 to effect adequate electrical connection therewith.

Selector unit

This unit is shown at 21 in Fig. 1 and comprises a front wall 19 made up of individual strips of insulating material and a rear wall 20 also of insulating material. Supported between the walls 19 and 20 is a plurality of pins 22, one for each possible marking position of the response sheet. The left hand end of each pin (Fig. 13) is supported in a metallic cap 23 against which a spring 24 encircling the pin abuts. Each pin has a section 25 of enlarged diameter intermediate its end, each section having metallic portions at the extremities and an insulating portion at the center.

The sensing resistor and selector units are the same as in my copending application where their specific structure is set forth in greater detail, together with their manner of insertion into the machine. For the purposes of the invention of said application, the sections 25 on pins 22 divide the current running from the sensing pins 12, 15 and resistors 18 to separate the counts of right and wrong responses. For the purposes of the present invention, the sections 25 are ineffective so that pins 22 may be considered as simply conductors extending from the resistors, through frame 21 to a point beyond the frame.

Plugboard unit

This is a new unit consisting of a panel 26 (Fig. 1) of insulating material in which are embedded plug sockets 27, one for each possible marking position, and located in alignment with the related pins 22 (see Fig. 18). At its lower end, panel 26 is provided with a set of ninety plug sockets 28 which may be electrically connected with any of the sockets 27 by means of insertible plug wires 29.

The panel is supported in a frame 30 which in turn is suitably guided for horizontal movement between the side frames 11 of the machine. After panel 26 is placed in frame 30, the latter is moved toward the left as viewed in Fig. 1, so that the sockets 27 abut against pins 22. In one use of the machine, the sockets abut directly against the pins as in Fig. 13.

Provision is made whereby a so-called "key" sheet K and a so-called "commoning" sheet C (see Figs. 9 and 10) may be placed between the pins 22 and sockets 27. For this purpose panel 26 has a spring blade 31 and blocks 42 (Fig. 18) to guide and retain these sheets in position. The manner of configuration and functions of these sheets will be explained later under the headings "Key sheet" and "Commoning sheet."

We will first consider the use of the device without these sheets, so that with panel 26 in position as in Fig. 13 there is an uninterrupted electrical connection from a pencil mark on the response sheet through pin 12, resistor 18 and pin 22 to the related socket 27.

Response sheet handling mechanism

The manner in which the marked response sheet is inserted in the machine and sensed, and which is the same as in my copending application, will now be explained.

Referring to Fig. 1, the response sheet R is inserted through the chute 16 through which it drops to rest upon a shutter 33. The sheet is inserted with the markings facing the sensing blades 12 and 15. An operating key 34 is now depressed. This key is pivoted at 35 and through a link 36 and an arm 37 causes a cross-rod 38 to rock counterclockwise. Secured to the rod 38 (see also Fig. 4) is an arm 39 upon which is pivoted a latch 40 between which and an extension of arm 39 there is a spring 41. Latch 40 hooks under an extension 42 of a member 43 which is pivoted at 44. As a result of the depression of key 34, arm 39 is rocked counterclockwise and hook 40 rocks member 43 clockwise causing its upper extremity to close a pair of contacts 45. Closure of contacts 45 will complete a circuit through the driving motor M. Fig. 20 shows the circuit connection through the motor M when the main switch 203 is closed.

This circuit is traceable from one side of line 200, switch 203, motor M, start key contacts 46, a switch 47, limit contacts 48, contacts 145, a switch 52, wire 209 to the other side of line 201. The switches 47 and 52 and contacts 48 and 145 are closed at this time, as will be more fully explained later.

The member 43 (Fig. 1) upon being rocked is engaged at its upper end by a spring pressed latch 53 which serves to hold the member in its rocked position and incidentally maintains contacts 45 closed. At the extremity of the upward stroke of latch 40, its left hand edge engages a pin 54 causing the latch to rock clockwise about its pivot and disengage the member 43.

The shaft of motor M carries a worm 55 (see also Fig. 4) which drives the worm wheel 56 on a shaft 57 to which is also secured a gear 58 meshing with a gear 59 secured to a tube 60, whose opposite extremity carries a clutch driving element 61. Supported within tube 60 is a shaft 62 on whose extremity is mounted a disk 63. The disk 63 has pivoted thereto a pair of dogs 64 and 65 connected together by an arcuate link 66. A spring 67 normally urges the dogs in a clockwise direction to effect clutching engagement with driving element 61. This engagement is prevented when the dogs are in the position shown in Fig. 1, due to the engagement of dog 64 with the lower extremity of member 43. When the member 43 is rocked under control of the key 34, dog 64 is released so that spring 67 may effect a clutching engagement, upon which the disk 63 is driven through a half revolution, wherein the member 43 is returned to its normal position and where its lower extremity will engage dog 65 and cause uncoupling of the clutch connection. Member 43 is released from its latched position prior to the arrival of dog 65 in the half revolution advanced position. This release is effected through engagement of the protruding end of dog 64 with an extension 68 of the latch 53.

By virtue of the provision of pin 54 which rocks latch 40 out of engagement with member 43, the disk 63 can only make a half revolution, regardless of whether the key 34 is held depressed or not. On the periphery of disk 63 are a pair of notches 69 in which a rebound latch 70 engages to prevent rebound of the parts upon declutching. Lying adjacent the latch 70 is a pair of contacts 71 which are connected in parallel with contacts 45 (see Fig. 20). These contacts take over control of the motor circuit from the period shortly after disk 63 commences to rotate and maintain the circuit until rotation of the disk is interrupted at the half revolution point.

Extending from disk 63 is an eccentrically mounted pin 72 upon which is supported one end of a connecting rod 73 whose opposite end carries a pin 74 (see also Fig. 4). The pin 74 carries a pair of links 75 whose opposite ends are pivoted to a pin 76 supported in a fixed frame 77. Pin 74 also supports a second pair of links 78 whose opposite ends are pivoted to a pin 79 carried by a slidable frame 80. The frame 80 is provided with rollers 81 which are movable horizontally as viewed in Fig. 1 between guide rails 82 (Fig. 4) secured to the side frames 11 of the machine. The pairs of links 75 and 78 form a toggle which, when the eccentric pin 72 moves from the position of Fig. 1 through a half revolution, brings the three pins 74, 76 and 79 into approximate alignment, causing the frame 80 to be forcibly moved toward the right as viewed in Fig. 1.

Resiliently mounted on the frame 80 is a platen 83. The structure causes the platen 83 to be pressed tightly against the response sheet R with the pressure evenly distributed over the entire area of the platen.

With the platen pressed firmly against the response sheet and the latter in turn tightly pressed against the sensing blades 12, 15, the markings on the sheet will control the electric circuits to be described hereinafter to control the operation of the printing mechanism. Following this, the operating key 34 is depressed a second time and again the member 43 is rocked to release the clutch dog 65 for engagement with the driving element 61 and disk 63 will make a second half revolution, contacts 45 closing to initially complete the circuit through the motor M and contacts 71 picking up and maintaining the circuit until the half revolution has been completed. During this half revolution, the toggle is again broken and frame 80 retracted to the position of Fig. 1.

The shutter 33 is slidably mounted on a fixed cross-plate 84. The shutter 33 has pin and slot connection 85 with a lever 86 pivoted upon a bracket 87 which is secured to the platen 83. Also pivoted on bracket 87 is a latch 88 normally urged by a spring 89 in a clockwise direction. At the beginning of operations, the latch 88 and lever 86 occupy the relative position shown in Fig. 1. When the platen 83 moves toward the right carrying therewith the bracket 87, lever 86 is caused to turn in a clockwise direction inasmuch as the pin and slot connection 85 remains stationary. Due to this rocking of lever 86, the latch 88 is permitted to rock under a shoulder 89' of lever 86 so that, when the platen is now retracted, the lever 86 held by latch 88 will return with the parts maintaining a displaced relationship, whereby the shutter 33 is moved toward the left as viewed in Fig. 1, so that the response sheet may drop of its own weight into a suitable hopper.

In Figs. 1 and 4, the rod 38 has a depending arm 90, the free end of which has pin and slot connection 91 with a link 92 whose opposite end is connected to a bell crank 93 which is pivoted to the frame of the machine and which carries a pin 94 underlying a finger of latch 88. When the key 34 is depressed the second time, the pin in the lower end of arm 90 moves toward the right within the slot in link 92 without disturbing the link. When the key is released, however, the link 92 is drawn toward the right, rocking the bell crank 93 clockwise as viewed in Fig. 1 to actuate latch 88 for the release of lever 86 whereupon, under the influence of spring 95, shutter 33 will return to its intercepting position.

The foregoing briefly describes the operation of the machine in handling the record sheets in the same manner as in my copending application.

*Reading control contacts*

For the purposes of the present invention, two pairs of contacts 96 and 97, Figs. 1, 4 and 5, are provided which are located side by side with the lower blade of contacts 96 in the same plane with the upper blade of contacts 97. An actuating pin 98 is mounted in the lower extremity of connecting rod 73 and the operation is such that during the first half revolution, explained hereinabove, the pin 98 strikes and passes by the two coplaner blades of the contacts 96 and 97. The blade of contacts 96 is shorter than that of contacts 97 so that, while the pin 98 will strike both together to cause concurrent opening of contacts 96 and closure of contacts 97, the contacts 96 will be released to close, while contacts 97 are still closed and they in turn will be released to reopen shortly thereafter. As will be explained in connection with the circuit diagram, these contacts serve to initiate the operation of the printing mechanism.

Printing mechanism

The printing mechanism is shown in Fig. 2 where the side frames thereof are indicated at 100. This framework is located with respect to the response sheet sensing mechanism as indicated in Fig. 1, and the connection between the record sensing and feeding mechanism and the printing devices is of an electrical nature, as the printing devices are provided with their own motor M2 (Fig. 2).

Referring to Figs. 3 and 6, the printing wheels 101, of which there are ninety-two provided, are ratchet wheels with a number of teeth omitted in the part of the periphery opposite the printing platen 102. Normally, at the beginning of operations the relationship between the ratchet wheel and the platen is as shown in Fig. 3. Under control of the sensing devices the ratchet wheels are stepped ahead in a clockwise direction, so that one or more of the ratchet teeth moves downwardly past the common center line of the ratchet and platen. Later, when printing is to be effected, the platen is moved against the ratchet wheels and the latter are rotated in a counterclockwise direction back to their home position. In doing so, the high points on the ratchet teeth will make lines of marks on the record sheet as in Fig. 11 to form a so-called "laddergraph."

The ratchet wheels 101 are frictionally held on a shaft 103, whose main portion is grooved to provide a number of rings 104 (see Fig. 6), upon which the ratchet wheels are supported. In the grooves adjoining the ratchet wheels are positioned semi-circular members 105 (Fig. 3). Each ratchet wheel is provided with pins 106 between which spring wires 107 are flexed against the members 105. This arrangement provides an individual frictional connection between shaft 103 and each ratchet wheel 101. During the setting of the ratchet wheels, the shaft 103 is stationary and, as the wheels are stepped ahead, the frictional devices serve to hold the wheels in their displaced positions.

In the same plane with each wheel 100 is a pawl 108. To permit more open spacing between the pawls 108 and to maintain the closer spacing of the wheels, the pawls are arranged in two rows as shown in Fig. 3, so that the pawls in one row cooperate with one set of wheels and the pawls in the other row cooperate with the remaining wheels. Each line of pawls is supported in a frame 109 which is pivotally mounted on studs 110 extending from the side frames 100 (see Figs. 2 and 6). During the setting operation, the frame 109 remains stationary as shown. The pawls are spaced in the frame 109 by combs 111 and 112. Each pawl 108 is provided with two steps designated 113 and 114 (Fig. 16) which cooperate with a pivot plate 115. Between the plate 115 and the pawl 108 is a spring 119. Normally, the spring 119 tends to rock the pawl 108 in a clockwise direction about its upper step 113 so that the toe 116 of the pawl is held in engagement with a tooth of ratchet wheel 101.

The pawls are actuated by means of a pair of magnets, there being one pair for each row of pawls. These magnets are designated CR and CL in Fig. 3 to identify them as the right hand coil and the left hand coil associated with the right hand and left hand row of pawls 108 respectively. These magnets as will be explained in further detail are supported on a carriage 120 which is moved in a direction parallel to the line of pawls, so that each magnet passes over the related row of pawls in succession. With a magnet in line with any of its pawls 108, energization of the magnet will attract the pawl, causing it to rock from the dotted to the full line position as shown in Fig. 16, wherein the step 113 has snapped out of engagement with the pivot plate 115 and step 114 now serves as the pivot point. Upon deenergization of the magnet, spring 119 will draw the pawl toward the left to the position shown in Fig. 16a. The cores 117 of magnets CL and CR are rectangular in outline (see Fig. 17), and extending across the pawls between them and the magnets are residual strips 118 whose ends are fastened to frame 109. Due to the spacing of the pawls 108, the magnets CR and CL alternate in aligning with the pawls 108, that is, the core 117 of magnet CR first aligns with pawl 108 in the right hand row, then the magnet CL aligns with the next pawl in the left hand row and so on.

The magnets CL and CR are fastened to the traveling carriage 120 to which is also secured pairs of rollers 121. The rollers are positioned in line with the upper ends of the pawls 108 and with the pawls in their normal or lower position, that is, in notch 113, the rollers 121 pass over the tops thereof without appreciably disturbing them. When a pawl has been shifted to the position of Fig. 16a as a result of its attraction by a magnet CL or CR, the upper end of the pawl will have been elevated slightly in the path of the roller. The rollers are located somewhat to either side of the core 117 (see Fig. 17) so that, after the pawl has been elevated, one of the rollers 121, depending on which direction the carriage is traveling, will strike against the raised pawl and depress it back to its original position. In doing so, of course, it will cause the ratchet wheel 101 to advance one step or tooth.

The carriage 120 (see Figs. 2 and 6) is supported on guide rods 122 for transverse movement. Rotatably mounted in the carriage is a member 123 which is threaded upon the driving shaft 124. At the extremity of this shaft is a pulley 125 which has belt connection 126 with the pulley 127 on a shaft 128 (see Figs. 3 and 7). Secured on shaft 128 is a coupling member 129 in engagement with a slidable coupling 130 which has integral with it a gear 131. Referring to Fig. 2, the gear 131 through idler 132 connects with pinion 133 on the shaft of motor M2. With motor M2 in operation, the threaded shaft 124 of Fig. 6 will rotate through the gear and pulley connections traced.

Extending through the member 123 is a pin 134 which abuts against the end of a T-shaped arm 135. The arm 135 is slotted at 136 and pivoted on a pin 137 secured in the carriage 120. The springs 138 serve to hold the arm 135 in position to serve as a resilient connection between the member 123 and the carriage 120. With the arm 135 in the position of Fig. 2, member 123 is restrained against clockwise rotation so that, as the shaft 124 rotates in the clockwise direction, member 123 will travel toward the right as viewed in Fig. 6, and the carriage 120 will move therewith. At the right hand end of shaft 124 there is affixed an arm 139. When carriage 120 reaches the right side, pin 134 will project into the plane of arm 139 and the arm 139 will strike the pin 134 and forcibly rotate the pin and its member 123 in a clockwise direction. In doing so, the pin 134 will force springs 138 to yield and rock arm 135 to the position shown in Fig. 3. As a result, further movement of the carriage cannot take place as long as the shaft 124 continues to rotate in the clockwise direction, inasmuch as member 123 and shaft 124 are secured for rotation together through the arm 139.

In order to move the carriage back again or toward the left as viewed in Fig. 6, the rotation of shaft 124 is reversed in the manner to be explained in connection with the circuit diagram. With the shaft reversed now and with arm 135 in the position of Fig. 3, member 123 is resiliently locked against counterclockwise rotation and the carriage will be driven toward the left. When it arrives back in its extreme left hand position, a second arm 140 secured on the shaft 124 will engage the pin 134 when the latter moves into the plane of rotation of the arm 140, so that member 123 will be rotated in a counterclockwise direction with the shaft 124. In doing so, the arm 135 will be snapped back to the position of Fig. 3, and the member 123 will revolve with the shaft without effecting any further transitory movement of the carriage.

The carriage is provided with an upwardly extending arm 141 which, when the carriage is in one extreme position, will engage and close two pairs of contacts designated 142 and 143 (Fig. 6). When the carriage is in the other extreme position, the arm will cause opening of a pair of contacts 144 and closure of contacts 145. In Fig. 3 the carriage has affixed thereto contact wiper blades 146 which traverse conducting blades 147 for the purpose of supplying connections to the traveling magnets CR and CL. The carriage is also provided with two U-shaped contact wipers 148 which traverse common conducting blades 149 and individual contact blades 150 (see Fig. 18). There are as many blades 150 provided as there are ratchet wheels 101. The upper extremities of blades 150 make contact with the plug sockets 28 in the panel 26. The lateral spacing of the blades is the same as that of the ratchet wheels, and the plug sockets are staggered in four rows for convenient spacing.

Briefly reviewing the operations involved in stepping the ratchet wheels ahead, the carriage 120 is driven along the shaft 124 with a continuous motion and, as the magnets CL or CR are in line with selected wheels 101, either one is energized to free the associated pawl 108 for advance into engagement with the next tooth. Thereafter, as the carriage continues its progress, the wheel 121 will forcibly return the pawl and through it cause advance of the ratchet wheel one step. The movement of the carriage in one direction takes place during the sensing of one response sheet, and its return movement takes place during the sensing of a succeeding sheet. During this return movement, the operation of the magnet in stepping the ratchet wheels ahead takes place in the same manner as during the forward movement, except that this time the other of the two wheels 121 causes the actual movement of the wheels as it passes over a selectively operated pawl 108. One of the ratchet wheels 101 carries a pin 151 (see Figs. 3 and 6), which pin is positioned to engage and open the pair of contacts 48 after such wheel has been advanced a predetermined number of steps. The wheel 101 on which the pin 151 is mounted is one which, as will be explained in connection with the circuit diagram, is advanced one tooth for each operation of the machine. In the present case the pin 151 is set so that it opens the contacts 48 after one hundred steps of movement of the wheel.

*Printing the graph.*—When it is desired to print from the ratchet wheels 101, a record sheet R3 (Fig. 11) is inserted around the platen 102 (as shown in Fig. 16) to a position where the leading edge, which is the lower edge of the sheet in Fig. 11, abuts shoulders 152 on spring-pressed fingers 153, of which there are several extending across the length of the platen. This record sheet may be provided with ruled lines as shown in Fig. 11 which face toward the ratchet wheels. Between the sheet and the wheels there is inserted with the sheet a sheet of carbon paper 154 to provide the inking medium. Platen 102 is supported at its extremities in a pair of arms 155 whose lower ends normally abut against pin 156. Springs 158 serve to hold the arms in the position shown in Fig. 3 where they are biased against the pins. The pins 156 are carried by arcuate members 159 on shaft 160. At the extremity of the shaft is a handle 161. When the handle is rocked in a counterclockwise direction, pin 156 turns likewise and releases the lower end of the arm 155 whereupon the springs 158 will cause the arms to rock in a clockwise direction about the pivot pins 157, so that the platen 102 is pressed firmly against the ratchet wheels 101. In effecting such movement, the platen through the carbon and record sheets causes a slight rocking of the fingers 153, so their stops 152 move into slots in plate 162 thus releasing the forward end of the record for advance.

At the upper end of each arm 155 there is connected a link 163, whose opposite end is connected at 164 to a link 165 (see also Fig. 2), which link 165 has connection in its opposite ends to the two frames 109. The clockwise rocking of arm 155 will through the links 163 and 165 cause the left hand frame 109 to rock about its pivot 110 in a counterclockwise direction and the right hand frame 109 to rock in the same direction, to cause all of the pawls 108 to be lifted out of engagement with the ratchet wheels 101. The lower end of one of the arms 155 has connection with a link 166 whose opposite end (see Fig. 7) has pin and slot connection 168 with a bell crank arm 169 pivoted at 170.

To one arm of this bell crank 169 is a pivoted spring-held lever with a pin 172 thereon, which pin rides in a circumferential groove in the slidable clutch member 130. Shifting of the bell crank 169 in a clockwise direction as viewed in Fig. 7 will disengage member 130 from the member 129, thereby disconnecting shaft 123 from driving engagement with the motor M2.

The member 130 on the side opposite gear 131 has a clutching element 173 which, when the slide is shifted, engages a companion member 174 which is integral with the pinion 175. With the parts shifted so that 173 and 174 are in engagement, the motor will drive pinion 175 from the motor pinion 133 to idler 132, gear 131, clutch coupling 173, 174 to pinion 175 (see Fig. 2). Through intermediate gearing generally designated 176, motion is transmitted to a gear 177 secured on the ratchet wheel supporting shaft 103.

Briefly, the shifting of the handle 161 in a counterclockwise direction has disconnected the motor drive of the carriage and effected connection between the motor and the shaft 103, so that the latter shaft is positively driven in a counterclockwise direction, and through the friction drive connections between the shaft and the wheels the latter are driven in the same direction. The shifting of the handle has also permitted the platen 102 to press against the teeth of the ratchet wheel, so that the latter in rotating will make impressions on the record sheet.

Handle 161 is limited in its counterclockwise movement by a pin 178 fixed in the side frame against which the radial surface of the member 159 (Figs. 2 and 3) strikes when the handle 161 has turned through about 180°. Secured on the shaft 160 (Figs. 3 and 7) is a member 179 which has two extensions 180 and 181. In the plane of this member is a lever 182 whose left hand end is in line with switch operating arms 183 and 184. These arms control contacts 47 and 52 respectively, which are shown in the circuit diagram in Fig. 20, and serve to control the circuits as will be explained hereinafter. When the handle is in the position shown in Fig. 3, the extension 180 engages and holds the lever 182 in the position shown to depress the arm 184 which causes related contacts 52 to remain closed. When the handle is rocked, lever 182 is released so that the contacts 52 may open under spring action and, when extension 181 engages and rocks lever 182 in a clockwise direction, the lever will engage arm 183 to cause opening of contacts 47 against spring action. On return of the handle, the contacts 47 will again close under spring action and contacts 52 will be closed by the lever 182.

Secured on shaft 103 on both sides of the ratchet wheels 101 are disks 185 which assist in feeding the record as the wheels are rotated, the platen 102 being freely mounted for rotation. Each wheel 101 is provided with a pin 186 (Fig. 3) which serves to locate the wheel in its home or starting position, wherein the pin abuts a stop 187. There is one stop 187 provided for each of the wheels and they are supported on a cross-rod 186a at one end and on the other end they are carried by an eccentric portion of a shaft 160. When the handle is rotated, the concurrent rocking of shaft 160 through a half revolution serves to draw the stops 187 toward the right as viewed in Fig. 3, so that the pins 186 will travel a short distance to the right beyond the position shown in Fig. 3. This is to provide an overthrow for the ratchet wheels and enable the last ratchet tooth to effect a clear print on the record. When the handle is returned to its initial position, the eccentric portion of shaft 160 slides the stops back and through the pins 186 will move the wheels 101 ahead to the starting position.

*Circuit diagram*

The operation of the machine to obtain the graphic record of Fig. 11 can now be explained as to sequence and the various operations involved in connection with the circuit diagram of Fig. 20. Current is supplied from 110 volt A. C. or D. C. lines designated 200 and 201 to which the circuits are connected through switches 202 and 203. When switch 202 is closed, the filament circuit for vacuum tubes designated 204, 205 and 206 are completed. This circuit may be traced from line 200, switch 202, wire 207, 130 ohm resistor, in series through the filaments of tubes 204, 205 and 206 back to line 201, through wire 208. Thereafter, a circuit is traceable from line 201, switch 203, wire 209, normally closed contacts 52, contacts 143, 142, relay magnet S2, wire 210, cathode of tube 204 (which is of the 25Z6 type), plate of this tube, 25 ohm resistor, wire 207, to other side of line 200. This circuit is completed when the carriage 120 is at the extreme right hand position as viewed in Fig. 6, which is the starting position of the device. It will be explained later that the operations may terminate with the carriage in the extreme left hand position as viewed in Fig. 6, in which case before operations commence the carriage will be automatically shifted to the opposite position.

Prior to inserting a response sheet in the machine, plug connections 29 are made between the sockets 27 representing the positions corresponding to correct answers and sockets corresponding to ratchet wheel positions. Thus, for example, in Fig. 20, if the upper five sockets are associated with question 1, the right answer marked for this question will be recorded in the first wheel, and if the lower five sockets represent the second question, the right answer mark therefor will control the second wheel. After these preliminaries a response sheet is inserted in the chute 16 of Fig. 1, and the operator depresses key 34 to close the start contacts 45 (Fig. 20). A circuit is then traceable from line 200, switch 203, motor M, contacts 45, contacts 47, contacts 48, relay contacts S2B now closed, contacts 143, contacts 52, wire 209, switch 203 to line 201. The motor M will cause a half revolution of shaft 62 (Fig. 1), and in making this half revolution the toggle 75, 78 will press the platen 83 against the response sheet, urging the latter into firm engagement with the sensing fingers 12 and 15.

Disks 63 on the shaft 62 will close contacts 71 which maintain the motor circuit energized throughout a half revolution. When the half revolution is completed, contacts 71 open deenergizing the motor M so that the parts remain in their displaced position with the platen pressing the response sheet against the sensing pins, and the related parts remain in such position until a subsequent operation of the start key. Just before the half revolution is completed, the pin 98 (Fig. 1), will cause momentary closure of contacts 97 and opening of contacts 96 and will thereafter permit contacts 96 to reclose before contacts 97 reopen. In Fig. 20 the initial closure of contacts 97 sets up a circuit from line 201, switch 203, wire 209, contacts 52, 143, 142, 97, relay magnet S1, wire 210, cathode and plate of tube 204, wire 207, switch 202 to line 200. When the contacts 96 now reclose while contacts 97 are still closed, a holding circuit is set up for the relay magnet S1 which is traceable from line 201, switch 203, wire 209, contacts 52, 96, relay contacts S1a, magnet S1, wire 210, back to line 200 as in the pickup circuit. At this point, both relay magnets S1 and S2 are energized and a circuit may now be traced from line 200, switch 202, motor M2, contacts S2e, winding 211 of the motor, contacts S1b, S2c, wire 209, switch 203, to line 201.

With motor M2 energized, the carriage 120 moves across the ratchet wheels carrying with it the magnets CL and CR, and also moving the connectors 148 across the contact segments 150 and common bars 149. When the carriage moves away from the side frame, it enables contacts 142 and 143 to open, thereby rendering any further operation of the start key contacts ineffective. When the lower wiper 148 (Fig. 20) strikes the contact segment 150 farthest to the left, a circuit is completed from the plus side of a series of five 45 volt B batteries designated B, through a 2 megohm resistor 18a, wire 212, left hand segment 150, lower wiper 148, lower common 149, wire 213, through a 10,000 ohm resistor 214 to the grid of tube 205 which is of the 25L6 type. A negative bias of 90 volts is placed on the grids of the tubes 205 and 206 to 2.75 megohm resistors connected to the battery through a wire 215. This bias cuts off the flow of all plate current. The positive voltage applied through the circuit traced through the 2 megohm resistor 18a is 135. This voltage breaks down the negative bias so that the grid becomes zero potential with respect to the cathode. As the grid becomes zero, plate current will flow from line 201, switch 202, wire 208, cathode and plate of tube 205, magnet CL, wire 210, cathode and plate of tube 204, wire 207, switch 202 to line 200.

At this time the magnet CL is in line with the extreme right hand ratchet wheel (Fig. 6), and its energization will trip the related pawl so that, as the carriage continues its movement, one of the rollers 121 will advance the ratchet wheel one step. As the carriage proceeds, the upper wiper 148 will bridge the next segment 150 which is the first one in the upper row, and at this time if a mark R2 has been made in the position plug connected, a circuit will be traced from plus side of battery B to common sensing pins 15, through the mark R2, the related pin 12, 2 megohm resistor 18, pin 22, socket 27, plug connection 29 to the #1 socket 28, segment 150, upper wiper 148, upper common 149, wire 216, 10,000 ohm resistor 214 to the grid of tube 206, breaking down the negative bias so that a circuit may now be traced from line 201, switch 202, wire 208, cathode and plate of tube 206, magnet CR, wire 210, cathode and grid of tube 204, wire 207 to line 200. The magnet CR at this time is in line with the second wheel 101 and as a result of its energization this wheel will subsequently be stepped one tooth.

As the carriage continues its movement across the wheels, the magnets CL and CR will be rendered effective in alternation as the upper and lower wipers 148 connect first the upper common and then the lower common 149 to the tubes 205 and 206 respectively. When the carriage reaches the last segment 150 on the right, a circuit is completed through the lower wiper 148 in the same manner as traced for the circuit through the first segment 150, that is, through the resistor 18a. The circuits through these two end segments are invariably completed for each movement of the carriage in either direction, and the associated end wheels will accordingly be stepped a distance representing the number of passages the carriage makes across the wheels. After the carriage has passed all the wheels, it will engage and cause closure of contacts 145 and at the same time open contacts 144. Since contacts 144 are in the holding circuit of relay magnet S2, the latter will become deenergized and, since its contacts S2c then open, the circuit through motor M2 and its winding 211 will be interrupted so that the carriage remains in this end position holding contacts 145 closed and contacts 144 open.

At this point, the inserted examination sheet has been sensed and the wheels 101 stepped in accordance with the significance of the marks on the sheet. It remains now to release the sheet for removal from the machine. This is done by depressing the start key a second time closing the contacts 45. Closure of contacts completes a circuit from line 200, switch 203, motor M, contacts 45, 47, 48, contacts 145 now closed, contacts 52, wire 209, switch 203 to line 201. The incidental closure of contacts 71 will keep the motor M running for the second half revolution during which the toggle 75, 78 (Fig. 1) is returned to the position of that figure. As a consequence, the platen is withdrawn from the examination sheet and the shutter 33 is retracted so that the sheet may drop down into the hopper. At the completion of the second half revolution, the machine is again at rest and in readiness to insert a second examination sheet into the chute 16.

At this time the carriage is in its left hand position as viewed in Fig. 6 so that, when the operator now presses the start key, the motor circuit M is completed and held as just traced through the contacts 145 and during the half revolution now taking place the platen 83 is again pressed against the second examination sheet, the pin 98 as before closing contacts 97 and opening contacts 96. The latter, as explained above, are in the holding circuit of the relay magnet S1 so that their opening at this time will deenergize the relay magnet. At this time both magnets S1 and S2 are deenergized so their contacts assume the position shown in Fig. 20. The effect of this is to reverse the direction of current flowing through the winding 211, so that the motor M2 now drives in the opposite direction to feed the carriage back to its initial starting position. The circuit through motor M2 is completed from line 200, switch 202, motor M2, contacts S2f, S1c, winding 211, contacts S2d, wire 209, switch 203 to line 201. During the return movement of the carriage, circuits through the magnets CL and CR will be completed in response to the sensing of marks in exactly the same manner as during the forward stroke of the carriage, and the invariable circuits through the end segments 150 will also be completed. When the carriage is again returned to its starting position in which it closes contacts 142 and 143, the latter complete a circuit through the relay magnet S2, which has already been traced. As a consequence, the contacts of this relay are shifted from the position shown in Fig. 20, of which contacts S2d open the circuit through the motor M2. The operator now recloses the start key contacts 45 to bring the shaft 62 back to its home position, during which movement the second examination sheet is released.

From this point on, the circuits involved in the sensing of the third and alternate examination sheets will be the same as explained in connection with the first, and the circuits involved in the sensing of the fourth and alternate examination sheets will be the same as explained and traced for the second. When one hundred sheets have been sensed, the contacts 48 open to prevent further operation of the motor M. The positioning of the contacts 48 to open at 100 is, of course, a matter of choice as it is obvious that it might be arranged to open after a fewer or greater number of examination sheets have been sensed.

*Reset and print operation*

After the last examination sheet has been sensed, the carriage may be at either of its extreme positions, and at such time it is desirable to print the graph under control of the ratchet wheels. The record sheet with its accompanying carbon is placed about the platen, and the handle 161 is swung in a counterclockwise direction as viewed in Fig. 3. This rocking of the handle will effect the mechanical coupling between the motor and the supporting shaft of the ratchet wheel, so that the latter are frictionally driven toward their home position when a circuit through the motor is completed. Assuming that the carriage is in the position in which contacts 145 are closed, it should be noted that at such time the relay magnet S2 is deenergized but the relay S1 is energized with the holding circuit for the latter going through contacts 52. Therefore, when handle 161 is rocked and through lever 182 causes opening of contacts 52, the relay magnet S1 will be deenergized and with both relays S2 and S1 deenergized the circuit through motor M2 and its winding 211 will be completed.

If the sensing operation had terminated with the carriage in the opposite position holding contacts 142 and 143 closed, relay magnet S1 would be in deenergized condition and magnet S2 would be energized with its holding circuit going through the contacts 52. Thus, whether the carriage is in either extreme position, one of the relay magnets is energized and the other deenergized, and upon rocking of the handle 161 both relay magnets S1 and S2 become deenergized due to opening of contacts 52 to enable completion of the circuits through the motor M2 which rotates the ratchet wheels back to their home position, during which rotation a series of columnar marks is made on the record sheet R3, the extent of each of which columns of marks made by any wheel is dependent upon the distance to which the related wheel had previously been advanced.

When all the wheels have returned to their home position, their supporting shaft simply slips within the wheels without effecting further movement thereof. The operator then swings handle 161 back to its starting position and during the return both the contacts 41 and 52 again close. Also, motor M2 is recoupled to drive the threaded shaft 124. If the carriage is in the position closing contacts 142, 143, the energizing circuit for magnet S2 is completed which is traceable from line 201, switch 203, wire 209, contacts 52, contacts 143, 142, relay magnet S2, wire 210, and back to line 200, through the tube 204. Magnet S2 by opening its contacts deenergizes motor M2. If the carriage is in the position closing contacts 145 (in which case contacts 142, 143, and 144 are open), no circuit is traceable to either magnet S1 or S2 and, since motor M2 is now coupled to threaded shaft 124, the carriage 120 is automatically returned to its starting position wherein it closes contacts 142 and 143 and upon such closure relay magnet S2 is energized through the circuit just traced, so that motor M2 becomes deenergized.

The record sheet R3 is then removed from platen 102 and will appear as in Fig. 11, wherein the two outside vertical lines of marks are printed from the two extreme wheels and represent the total number of response sheets sensed, while the intermediate vertical lines of marks represent the total number of marks sensed in the plug selected positions. Thus, in Fig. 11 if the total number of examination sheets sensed were twenty-five and the number of marks in line with question #1 were twenty, this might represent that out of twenty-five examinees twenty gave the correct response for the first question. The record R3 provides a condensed analysis of the complete results of an entire examination and offers to the examiner a picture of the questions that have been difficult for the examinees as well as those which appeared to be easier to answer.

In the operation of the machine, it may be desirable to indicate on the examination sheet itself an indication of which questions were answered correctly, and in such case the examination sheet itself is inserted around the platen 102 with a suitable sheet of carbon, after the sheet has been sensed. The handle 161 is operated for each examination sheet. With such procedure the wheels are advanced no more than one step in response to the sensing of the one examination sheet, since after the sheet is sensed it is inserted in the printing position and the wheels restored, with the advanced teeth marking the examination sheet itself as indicated in Fig. 12. In this case the marks in line with the question numbering would indicate the numbers of the questions that have been correctly answered.

A still further mode of operation of the machine is represented by the form of graph shown in Fig. 15 which is obtained by operating the printing handle 161 after each examination sheet has been sensed in the same manner as in obtaining the results of Fig. 12, with the exception that for this operation a record sheet R4 is employed and it remains around the platen. For this operation the end driving disks 185 of Fig. 6 are omitted. In this form the teeth of the ratchets alone advance the record sheet and the spacing between the marks will be greater than on the sheet of Fig. 11, because of the overthrow or excessive movement of the ratchet wheels during their restoration.

*Use of the key and commoning sheets*

It will be appreciated that for each different examination a different plugging arrangement is required between the sockets 27 and 28 on the plugboard panel 26, inasmuch as it is necessary that the upper end of the plug connection 29 be inserted in the socket 27 representing the correct response. By the use of the key and commoning sheets shown in Figs. 9 and 10, a single plugging of the device will suffice for all examinations of the same type. In order to score an examination sheet as explained in my copending application, there is provided a so-called "key" K (Fig. 9) sheet which is provided with index point positions corresponding to the marking positions on the examination sheet. This key sheet is perforated in positions corresponding to the correct answers and generally consists of a card with all the index point positions partly perforated, so that the operator may readily push through the positions corresponding to the correct answers. The use of such sheet in scoring the examination is explained in my copending application and need not be discussed herein, except to point out that since the examination sheets are generally scored individually, before the present mechanism is employed to construct a graph such key sheet is already available at the time the graph is to be prepared and requires no further effort to prepare such sheet on the part of the operator. The commoning sheet of Fig. 10, which is also shown in exaggerated section in Fig. 14, is a sheet of record material which has the layer of conductive ink 220 extending across the five response positions for each question. The two layers on opposite sides are connected through suitable small holes or incisions so that the layer on one side is electrically connected with the layer on the opposite side. In operation, the key sheet and commoning sheet are placed together and suitably held on the left hand side of panel 26 as seen in Fig. 1 by a suitable clip 31. With such an arrangement it is only necessary to insert for any question one plug connection 29 in any one of the five sockets related to a particular question, so that, for example as in Fig. 14, the key sheet K has a perforation in line with the second pin 22 from the top, indicating that a mark in the related position would be the correct one. A circuit from the pencil mark on the record R, therefore, would run from the pin 15, through pin 12, resistor 18, pin 22, through the perforation in sheet K to the conductive ink on the left side of sheet C, thence through sheet C to the conductive ink on the opposite side and thence through the socket 27 and plug connection 29. It is apparent that with the connection 29 made in any of the five sockets 27, the circuit would still be completed. If now another type of examination is to be handled, a different key sheet would be available, in which case, for example, the perforation in sheet K might be in line with the bottom pin 22 and the circuit would still run from this bottom pin 22 through the perforation and the conductive ink layers to the same socket 27 and plug connection 29.

*Analysis of paired responses*

Figure 21:
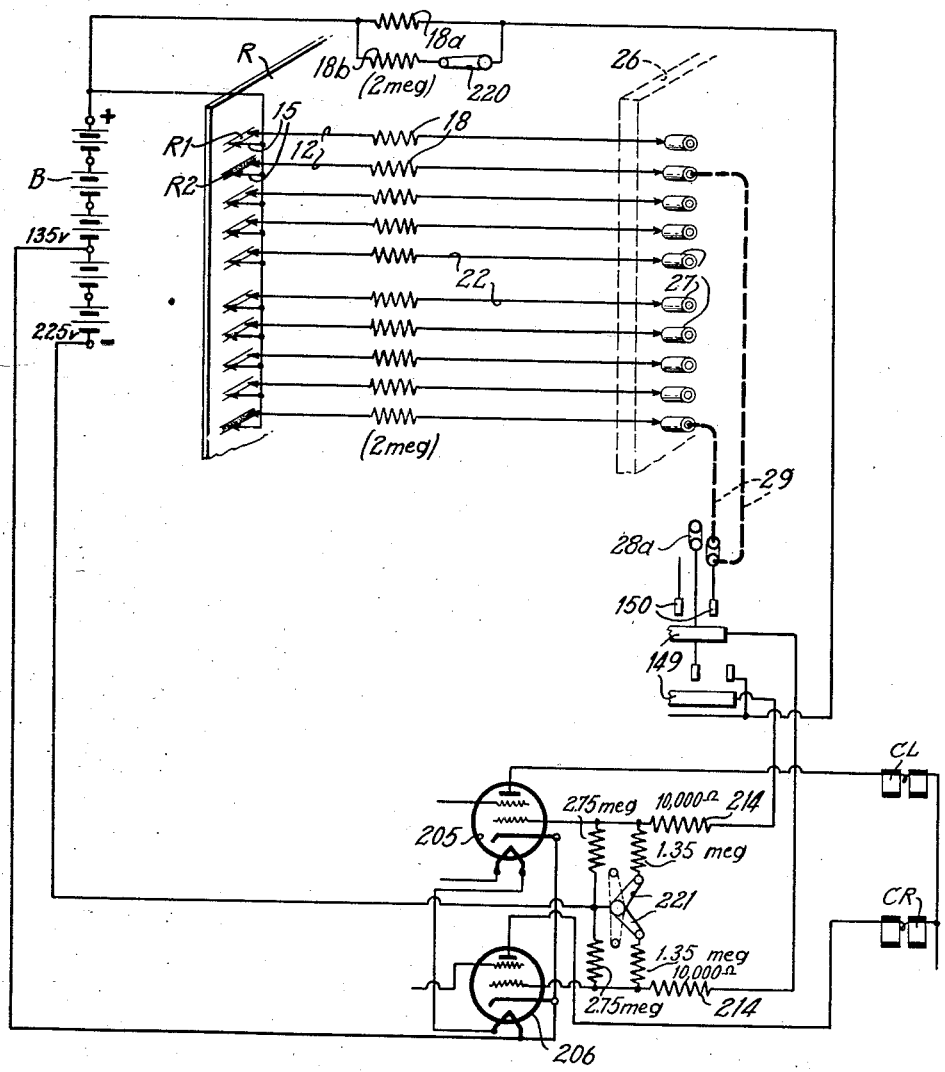
Fig. 21 is a view showing part of the electric circuits with certain modifications made therein.

In Fig. 21 is shown a modified circuit diagram in which a second 2 megohm resistor 18b is provided which by means of a switch 220 may be connected in parallel with resistors 18a. A pair of 1.35 ohm resistors are also provided which may, by rocking switches 221 to the full line positions, be connected in the grid circuits of the tubes 205 and 206, as shown, in parallel with the 2.75 megohm resistors. Any socket 28a may receive two plug connections 29 extending to two sockets 27.

With this arrangement, current flowing through only one of the pair of connections 29 from a mark R2 will not activate the tubes 205, 206. The tubes will only respond to the concurrent sensing of a pair of marks R2, one in each of the two connected positions.

The purpose of the arrangement is to enable an analysis to be made to determine whether related questions of certain pairs have both been answered correctly and the ultimate graph will indicate the number of pairs of selected positions containing marks in both positions.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, a plurality of ratchet wheels arranged in a row, a plurality of pawls arranged in a row, one pawl for each wheel, each pawl normally engaging a wheel, a carriage, means for moving said carriage along said row of pawls, a magnet on said carriage, means for momentarily energizing said magnet during the movement of the carriage when the magnet is in line with any pawl to disengage the pawl from its wheel, means effective when the pawl is disengaged for advancing the pawl into engagement with a further tooth of the ratchet, and means on the carriage effective during the continued movement thereof for causing the pawl to advance its ratchet wheel.

2. In a machine of the class described, a plurality of wheels arranged in a row, an actuating pawl for each, said pawls also being arranged in a row, a carriage movable across said row of pawls, driving means for said carriage operative to effect a reciprocation thereof, a magnet on the carriage, effective upon energization during the movement of the carriage for actuating any pawl in line with the magnet at the time the magnet is energized, and means on the carriage operative after a pawl is actuated, and with the carriage moving in either direction, for causing the actuated pawl to advance its related wheel.

3. In a machine of the class described, a row of wheels, a plurality of actuating pawls, one for each wheel, each of which is movable from an active to an inactive position and which is arranged to advance the related wheel when moved from said active to inactive position, latching means normally holding the pawl in its inactive position, a magnet common to said plurality of pawls, means for operatively associating the magnet with any one of the pawls, said magnet operating upon energization to move the selected pawl out of engagement with said latching means, a spring effective upon said movement to draw the pawl to its active position, and means common to said plurality of pawls for engaging and positively returning the selected pawl to its inactive position to thereby advance the related wheel.

4. The invention set forth in claim 3 in which there is provided means for moving the magnet past all the pawls in succession and with an uninterrupted motion, and means for energizing the magnet when it is in line with the selected pawl.

5. In a machine of the class described, a plurality of printing wheels, a supporting shaft, said wheels being frictionally mounted on the shaft, a printing platen, means for holding the platen, normally spaced from the wheels and spring biased into engagement therewith, driving means for the shaft, normally disconnected therefrom, means for angularly displacing the wheels upon the shaft different amounts from a home position, home position stops for the wheels, and means for releasing said holding means and causing the platen to engage said wheels, said means at the same time causing the driving means to be connected to the shaft whereby the wheels will be frictionally restored to home position against their stops and in so doing each wheel will print a line on a record about the platen proportional in length to the angular distance the wheel had been displaced.

6. In a machine controlled by examination sheets having marking positions marked in accordance with correct and incorrect responses to questions, a plurality of sensing devices for concurrently sensing all marking positions, a plurality of wheels, one for each question, means for associating the sensing device of the marking positions related to the correct responses with the related wheels, means for associating the sensing devices of any pair of marking positions with any single selected wheel, means controlled by the sensing devices, singly or in pairs, in response to the sensing of marks or pairs of marks representing correct responses for causing an operation of the related question wheels, and means for selectively rendering either single responses or pair of responses effective for controlling said last named means.

7. In a machine of the class described, a plurality of wheels arranged in a row, a plurality of actuating elements arranged in a row, one element for each wheel, each element being movable from an actuating position to a selecting position and back again, the movement from selecting position to actuating position causing advance of the related wheel, a carriage, means for continuously moving said carriage along said row of actuating elements, selecting means on said carriage, means operative while the carriage is in motion for causing said selecting means to selectively cause movement of one or more actuating elements to their selecting positions, and means for returning all selected elements to their actuating positions to advance their related wheels.

8. In a machine of the class described, a plurality of displaceable devices arranged in a row, a plurality of actuating elements arranged in a row, one element for each device, each element being movable from an actuating position to a selecting position and back again, the movement from selecting position to actuating position causing displacement of the related device, a carriage, means for continuously moving said carriage along said row of actuating elements, selecting means on said carriage, means operative while the carriage is in motion for causing said selecting means to selectively cause movement of one or more actuating elements to their selecting positions, and means for returning all selected elements to their actuating positions to displace their related devices.

9. The invention set forth in claim 8 in which the last named means for returning the selected elements is on the carriage and positioned to operate during the movement of the carriage to return a selected element while another element is being moved to selecting position.

10. In a machine of the class described controlled by a record having a plurality of marking positions thereon, the combination of devices for concurrently sensing said marking positions, a row of wheels, a carriage, means for moving the carriage across the row of wheels with a continuous, uninterrupted motion, a magnet on said carriage, means controlled by the carriage for successively connecting said sensing devices to said magnet to complete circuits therethrough in response to the sensing of marks in said positions, a normally ineffective connecting device between the carriage and said wheels through which the carriage causes the wheels to be advanced, energization of said magnet when in line with a wheel rendering said connecting device effective, said carriage directly by its movement engaging the device to cause advance of said wheel.

11. In a machine of the class described, a plurality of printing wheels, a supporting shaft therefor, each wheel being separately, frictionally mounted on the shaft, an advancing device for each wheel, a home position stop for each wheel, a carriage, means for moving said carriage across all of said advancing devices, means on the carriage for selectively operating one or more of said advancing devices during a single movement of the carriage across the devices to cause advance of selected ones of said wheels away from their home position stops, a printing platen located adjacent to said wheels, driving means for said shaft normally disconnected therefrom, means for causing the platen to engage said wheels, said means at the same time causing the driving means to be connected to the shaft whereby the advanced wheels will be frictionally restored to home position against their stops and in so doing each advanced wheel will print upon the platen during its restoration.

12. In a machine of the class described, a line of wheels, a line of actuating members, one for each wheel, said members being aligned in a common plane in inactive position, and separately biased to move out of alignment into an active position, a device movable along the line of actuating members, means for moving the device with a continuous uninterrupted motion, means for rendering said device repeatedly effective during a single movement in one direction to move a plurality of selected members out of normal alignment in succession, as the device moves along the line, and means movable with said device and effective during its movement in said one direction for restoring each member to inactive position after it has been moved to active position by said device and before the next member is moved to active position, each member in moving from its active to inactive position causing advance of its associated wheel.

REYNOLD B. JOHNSON.